United States Patent [19]
Bertus et al.

[11] 3,856,879
[45] Dec. 24, 1974

[54] OXIDATIVE DEHYDROGENATION

[75] Inventors: Brent J. Bertus; Darrell W. Walker, both of Bartlesville, Okla.

[73] Assignee: Phillips Petroleum Company, Bartlesville, Okla.

[22] Filed: Nov. 6, 1972

[21] Appl. No.: 303,766

[52] U.S. Cl........ 260/680 E, 260/666 A, 260/683.3
[51] Int. Cl............................................... C07c 5/18
[58] Field of Search.......... 260/680 D, 680 E, 683.3

[56] References Cited
UNITED STATES PATENTS

| | | | |
|---|---|---|---|
| 3,268,611 | 8/1966 | Bajars | 260/680 D |
| 3,274,285 | 9/1966 | Bajars | 260/680 D |
| 3,666,687 | 5/1972 | Croce et al. | 260/680 E |
| 3,758,625 | 9/1973 | Cohen | 260/680 E |
| 3,784,627 | 1/1974 | Bertus | 260/683.3 |

*Primary Examiner*—Paul M. Coughlan, Jr.

[57] ABSTRACT

A dehydrogenatable feed is subjected to oxidative dehydrogenation conditions in the presence of an oxygen-containing gas and a catalyst consisting essentially of a metal sulfate containing from 0 to 30 mole percent excess metal in the form of free metal or metal oxide, the metal being nickel, cobalt, or iron.

10 Claims, No Drawings

OXIDATIVE DEHYDROGENATION

The invention relates to an oxidative dehydrogenation process.

A variety of dehydrogenation catalyst compositions and systems are known. However, the search for better and more effective catalyst compositions and processes continues. In particular, it is desirable to obtain a simple and relatively inexpensive dehydrogenation catalyst which will provide acceptable conversion and modivity under normal conditions.

In accordance with the present invention it has been found that a suitable feed can be dehydrogenated in the presence of an oxygen-containing gas and a catalyst consisting essentially of a metal sulfate containing from 0 to 30 mole percent excess metal in the form of free metal or metal oxide, the metal being nickel, cobalt, or iron.

Accordingly, it is an object of this invention to provide a new and improved catalyst for an oxidative dehydrogenation process. Another object of the invention is to provide a simpler catalyst which is relatively less expensive to prepare. A further object of the invention is to achieve effective yields of the desired products in dehydrogenation processes. Other objects, aspects and advantages of the invention will be apparent from a study of the specification and appended claims.

Organic feedstocks which can be employed in the present invention are those feedstocks containing one or more dehydrogenatable organic compounds. Such compounds can be characterized as containing at least one

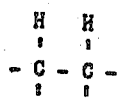

grouping. These dehydrogenatable organic compounds can contain from 2 to 50 or more carbon atoms per molecule, but such compounds containing from 2 to 12 carbon atoms per molecule are presently preferred because of their greater commercial availability. Particularly applicable for processing in accordance with the present invention are hydrocarbon compounds, including the cycloparaffins having from 3 to 12 carbon atoms per molecule whether branched or unbranched, the acyclic paraffins having from 2 to 12 carbon atoms per molecule whether branched or unbranched and the cyclic and acyclic monoolefins having from 4 to 12 carbon atoms per molecule whether branched or unbranched. The conversion of n-butane to linear butenes and/or butadiene, isopentane to isoamylenes and isoprene, and butenes to butadiene, are representative examples of dehydrogenation processes enjoying commercial significance. Additional examples of dehydrogenatable feed components include ethane, propane, cyclopropane, isobutane, pentane, cyclopentane, hexane, cyclohexane, ethylcyclohexane, 2-methylhexane, octane, 2,4-dimethyloctane, dodecane, cyclododecane, 2-methylbutene-1, hexene-2, octene-1, 3-methylnonene-4, dodecene-1, propylene, butene-1, butene-2, cyclobutene, cyclohexene, and the like, alone or in admixture. These dehydrogenatable materials can be employed in relatively pure form as the dehydrogenation feedstock or in admixture with nondehydrogenatable materials.

The feedstocks can be dehydrogenated over a broad range of contacting conditions including temperature, pressure, space rates and the like, presently employed in such arts. In general, the contacting temperature will be in the range of from about 800° to about 1300°F, with a temperature in the range of about 1000° to about 1200°F being presently preferred for improved conversion and selectivity. The contacting pressure will generally be within the range of from about 7 psia to about 500 psia, with a pressure in the range of about atmospheric pressure to about 250 psia being presently preferred because of reduced capital and operating expenses. The mole ratio of dehydrogenatable material to oxygen will generally be within the range of about 1:0.1 to about 1:4, preferably in the range of about 1:0.5 to about 1:1.5 for better conversion. Any suitable oxygen-containing gas can be employed in the process of the present invention including oxygen, a mixture of oxygen and nitrogen, a mixture of oxygen with other inert gases, and air, with air being presently preferred on the basis of economics.

The use of steam in the dehydrogenation reaction zone is beneficial for heat transfer purposes to remove the heat of reaction. Where steam is so employed, the ratio of steam to dehydrogenatable organic compound will generally be in the range of about 1:1 to about 50:1, although higher and lower ratios can be employed. The feed rate of dehydrogenatable material will depend upon the criteria of the particular installation, but will generally be in the range of about 50 to about 5000 gas hourly space velocity (GHSV), preferably in the range of about 200 to about 1000 GHSV.

The catalyst employed in the present invention consists essentially of at least one metal sulfate selected from the group consisting of nickel sulfate, cobalt sulfate, and iron sulfate, containing from 0 to about 30 mole percent, preferably from 0 to about 10 mole percent, excess metal in the form of the respective free metal or metal oxide. Of course relatively minor amounts of some elements such as sodium which are present as more or less trace constituents in the compounds being employed, or are present in a combined form not completely eliminated by drying, calcining and the like, and which do not inordinately interfere in the effectiveness of the catalyst composition nor in the process in which such compositions are employed, may be present.

The catalyst composition can be prepared by the calcining of the hydrated forms of the nickel, cobalt, or iron sulfate, or by calcining an admixture of compounds containing sulfur, oxygen, and at least one of nickel, cobalt or iron, which are convertible to the metal sulfate and/or metal oxide on calcining. Thus metal oxides or metal compounds convertible to the oxides on calcining such as the hydroxides; the nitrates; the carboxylates, such as acetates, propionates, tartrates, oxalates, and the like; as well as admixtures thereof; can be employed in the admixture to be calcined. The sulfur and oxygen can be present in elemental form or, more preferably, in the form of oxygen and sulfur-containing compounds. Where the nickel, cobalt, or iron is added to the admixture to be calcined in the form of free metal or metal oxide or a compound convertible to the oxide on calcining, the metal or metal compound can be employed in an amount to provide from 0 to 30 mole percent excess metal over that required to react with the sulfur and oxygen to form the metal sulfate. After calcining, the catalyst will contain the nickel sulfate, cobalt sulfate and/or iron sulfate and can contain up to 30 mole percent of the corresponding free metal or metal oxide.

In general, any method of preparation can be used which provides catalytic compositions containing the prescribed components in catalytically effective proportions. Thus the compositions can be prepared by any suitable method known to the art, including coprecipitation, impregnation, dry mixing, wet mixing, or the like, alone or in various combinations. When the catalyst forming ingredients have been suitably combined, they are subjected to calcining conditions. Suitable calcining conditions will generally include a temperature in the range of about 900° to about 1800°F for a time in the range of about 0.1 to about 24 hours. The calcination preferably includes the exposure of the catalyst composition during calcining to a molecular oxygen-containing gas, for example, air. The final calcined composition should have a suitably high surface area so as to permit effective catalytic operations, and it is presently preferred that the compositions have a surface area of at least about 1 square meter per gram. The calcined composition can be in the form of any convenient shape or structure, such as tablets, extrudates, finely divided powders, agglomerates, and the like. For convenience in shaping, such particle forming steps preferably are conducted prior to calcining, although various crushing or compacting steps can be accomplished subsequent thereto if desired.

The catalyst composition can be prepared with or without a support. Where desired for strength or catalyst distribution in various types of reactors, conventional supports can be utilized, for example, silica, boria, titania, zirconia, various types of alumina, and the like, as are well known in the art.

The effluent from the dehydrogenation contacting zone can be subjected to any suitable separation method so as to isolate and recover the desired product or products, and to separate unconverted or partially converted feedstocks or components in order to provide recycle or for other use.

In the processes of the invention carbon oxides and water may be formed by chemical reactions, or in a case of water, by condensation of steam. Trace amounts of other oxygenated products may also be formed. For example, trace amounts of ether compounds such as furan; aldehydes such as acetaldehyde, furfural; and minor amounts of acids such as acetic acid, can be obtained. Some minor amounts of cracked products can also be formed. These components can be readily separated by means known to the art and utilized for recycle or other application.

The following example is presented in further illustration of the invention, but should not be construed in undue limitation thereof.

EXAMPLE

A commercially available hydrated nickel sulfate was calcined at about 1200°F for a period of about 10 hours to drive off the water. The calcined product was verified to be nickel sulfate (NiSO$_4$) by the X-ray diffraction pattern of the calcined product. This composition was employed as the catalyst in a run utilizing a hydrocarbon feed rate of about 500 GHSV butane, an air feed rate sufficient to supply about 500 GHSV molecular oxygen and a steam feed rate of about 2500 GHSV, for the conversion of n-butane to products of a greater degree of unsaturation. The reaction zone was maintained at a temperature of about 1075°F and at atmospheric pressure. The reaction achieved a conversion of 29.0 mole percent and a modivity (gas phase selectivity) of 50.7 percent, with a yield of linear butenes of 11.1 mole percent and 3.6 mole percent of butadiene.

In contrast, a run utilizing a catalyst consisting of nickel oxide with a butane feed at about 1000°F and atmospheric pressure resulted in a conversion of 70 percent of the butane, but with a zero percent modivity, i.e., no butene or butadiene was produced, the butane feed having been converted substantially entirely to carbon oxides.

Reasonable variations and modifications of the invention are possible within the scope of the foregoing disclosure and the claims.

We claim:

1. A process for dehydrogenating at least one hydrocarbon containing at least one

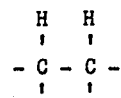

grouping and having from 2 to 12 carbon atoms per molecule, said hydrocarbon being selected from the group consisting of cycloparaffins, acyclic paraffins, cyclic monoolefins, and acyclic monoolefins, which comprises contacting reatants consisting essentially of said at least one hydrocarbon and oxygen, under oxidative dehydrogenation conditions in the presence of a catalyst consisting of nickel sulfate and from 0 to 30 mol percent excess nickel in the form of free nickel or nickel oxide, to dehydrogenate said at least one hydrocarbon.

2. A process in accordance with claim 1 wherein said at least one hydrocarbon comprises at least one acyclic paraffin.

3. A process in accordance with claim 1 wherein said oxidative dehydrogenation conditions include a temperature in the range of about 1000° to about 1200°F, a pressure in the range of about atmospheric pressure to about 250 psia, and a hydrocarbon: oxygen ratio in the range of about 1:0.5 to about 1:1.5.

4. A process in accordance with claim 3 wherein said at least one hydrocarbon comprises at least one acyclic paraffin.

5. A process in accordance with claim 1 wherein said at least one hydrocarbon is contacted with said catalyst in the presence of steam.

6. A process in accordance with claim 5 wherein said hydrocarbon comprises n-butane.

7. A process in accordance with claim 1 wherein said oxidative dehydrogenation conditions include a temperature in the range of about 800° to about 1300°F, a pressure in the range of about 7 psia to about 500 psia, a mol ratio of hydrocarbon to oxygen in the range of about 1:0.1 to about 1:4, and a feed rate of hydrocarbon in the range of about 50 to about 5000 GHSV.

8. A process in accordance with claim 7 wherein said at least one hydrocarbon is contacted with said catalyst in the presence of steam, with the mol ratio of steam to hydrocarbon being in the range of about 1:1 to about 50:1.

9. A process in accordance with claim 1 wherein said catalyst consists of nickel sulfate.

10. A process in accordance with claim 9 wherein said hydrocarbon comprises n-butane.

* * * * *